United States Patent [19]

Esposito et al.

[11] Patent Number: 5,317,788
[45] Date of Patent: Jun. 7, 1994

[54] HOOK FOR AN ELASTIC CORD AND HOOK AND CORD SET

[75] Inventors: Patsy Esposito, Brooklyn, N.Y.; Thierry Joubert, Ambert, France

[73] Assignees: Joubert S.A., Ambert, France; Products Finishing Corp., Brooklyn, N.Y.

[21] Appl. No.: 896,820

[22] Filed: Jun. 11, 1992

Related U.S. Application Data

[63] Continuation of Ser. No. 660,286, Feb. 22, 1991, abandoned.

[51] Int. Cl.⁵ .............................................. A44B 21/00
[52] U.S. Cl. ............................................................ 24/300
[58] Field of Search ...................... 24/115 A, 128, 298, 24/300, 301, 265 H; 248/499

[56] References Cited

U.S. PATENT DOCUMENTS

| | | | |
|---|---|---|---|
| 123,340 | 2/1872 | Fiester | 24/265 H |
| 252,832 | 1/1882 | Bernd | 24/265 H X |
| 3,328,064 | 6/1967 | Simon | 24/298 X |
| 4,831,692 | 5/1989 | Chuan | 24/300 |
| 5,003,672 | 4/1991 | Randall | 24/300 |

FOREIGN PATENT DOCUMENTS

| | | | |
|---|---|---|---|
| 3343554 | 6/1985 | Fed. Rep. of Germany | 24/128 |
| 713658 | 10/1931 | France | 24/115 A |
| 480123 | 4/1953 | Italy | 248/499 |
| 79324 | 11/1918 | Switzerland | 24/459 |

Primary Examiner—James R. Brittain
Attorney, Agent, or Firm—Darby & Darby

[57] ABSTRACT

The present invention is an elastic cord hook and a cord and hook set. The hook has a molded plastic body. Cord or bungee may be engaged in a channel in the hook base. The hook is provided with a safety hand grip including a lip so that the hood can be safely push manipulated effectively. The end of the hook is safely curved inward and provides an ear shaped inner configuration.

35 Claims, 1 Drawing Sheet

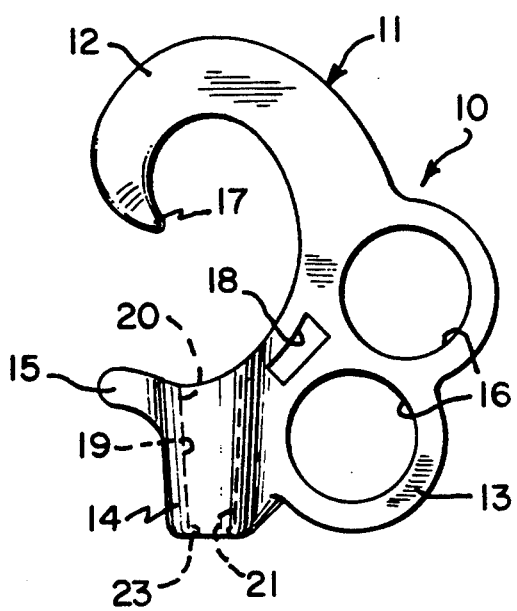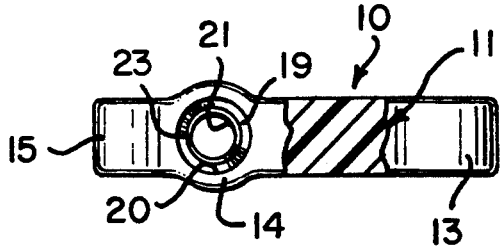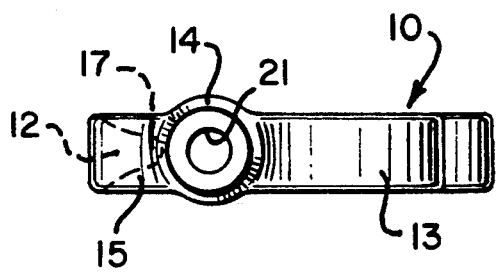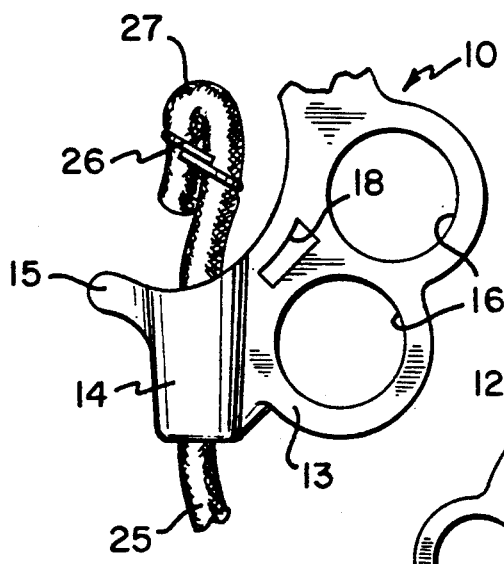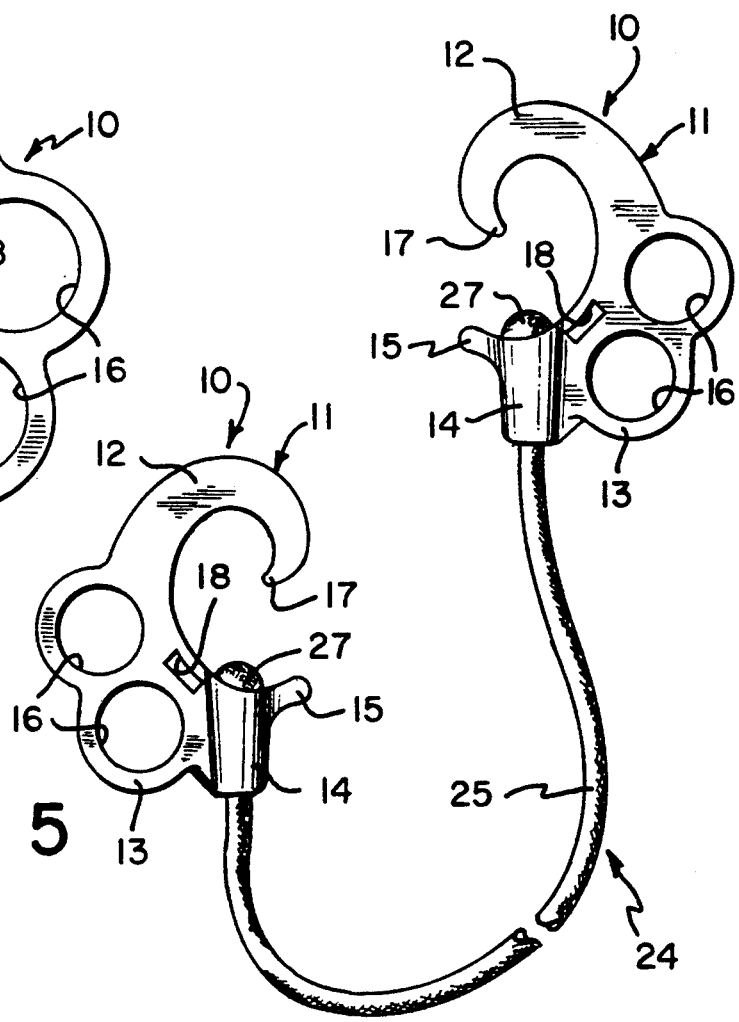

HOOK FOR AN ELASTIC CORD AND HOOK AND CORD SET

This is a continuation of application Ser. No. 660,286, filed Feb. 22, 1991, abandoned.

BACKGROUND OF THE INVENTION

The present invention is a hook for securing an elastic cord or bungee. The hook for an elastic cord or rope is particularly useful for lashing down luggage or packages to luggage carriers or other simple lashing down of parcels on luggage carriers, fixed or collapsible or for generally securing an elastic cord around articles to be secured. The hook of the present invention of course, is usable in almost any elastic cord application.

The usual hook for an elastic cord of the past was a heavy wire hook with the wire wound around the end of the elastic cord in the form of multiwind helical crimp. The hook was U shaped or J shaped so that it could be engaged about a strut, post or other object.

In a luggage carrier, in particular, there are ample places to engage the hook for an elastic cord at one end, lash it around a package or article of luggage then secure the other end of the elastic cord to the luggage carrier, securely lashing down the luggage.

The system of using elastic cords or bungee with hooks worked satisfactorily but there was a safety problem in the use of elastic cord.

The tension of the elastic cord often caused the tension hook to slip from the user's hand before the hook could be engaged. The dangerous rebound of a loose hook has always been a serious threat of injury, particularly, the point of the hook damaging the eye.

The prior art has made little provision for the adequate grasping of the hook for an elastic cord either for safety or for ease of engagement.

Elastic cord of course, in almost any environment is used with open hooks of some sort or another, for lashing, with the ever present danger of injury.

Ideally, some form of inexpensive, safely graspable, safety hook should be provided.

DESCRIPTION OF THE RELATED ART

The prior art is replete with attaching hooks and even hooks for elastic cords or hooks usable with elastic cord, bungee or rope. Such hooks of the past have either used the dangerous open J or U open hook configuration. The prior art has also not taken in account adequate safety grasping nor have hooks of the past, even when in plastic, adequately protected the open end of the hook.

U.S. Pat. No. 4,831,692 discloses an elastic hook easily attachable to an elastic cord end. The hook, while including a finger opening, does not adequately provide for safety grasping, nor is the open end of the hook carefully protected against injuring if the hook were to fly loose of grasp.

U.S. Pat. No. 3,328,064 is typical of a prior art flexible rope hook having some similarity to a hook for an elastic cord. The end of the rope is crimped into the hook for engagement.

U.S. Pat. No. 1,366,212 discloses a fastening device having a suspending opening 2 in addition to a rope hole 5 as seen in FIGS. 1 and 5.

U.S. Pat. No. 4,507,987 discloses a fence strand spreader having end hooks and a finger receiving bore 54 as seen in FIG. 2. The hooks is a small special purpose hook for engaging a wire strand.

U.S. Pat. No. 2,861,311 discloses a garment tie back having a crimped portion to secure the tie to the cord and a loop 22 for grasping each other to form a tie between the elastic cord ends.

U.S. Pat. No. 4,910,834 discloses a hook for use as a conventional cargo tie down using a rope.

U.S. Pat. No. 3,058,184 discloses a hook for a choker cable. The hook is detachably engagable with a ferrule on a cable for engaging a non-elastic cable around a load. The hook itself must be able to easily slidably engage the cable without risk of disengagement of the cable.

U.S. Pat. No. 3,186,704 discloses a double hook and spring combination for hands free holding of a tube and nipple. The hooks must nonslidably engage the tube and nipple to hold them together to be soldered.

SUMMARY OF THE INVENTION

The present invention is a hook for an elastic cord or bungee and elastic cord and hooks set. The hook for an elastic cord of the present invention is hand gripable so that the fingers may be engaged through the finger holes and around the hook when it includes the elastic cord. The lip on the hook, in combination with the finger openings, helps stabilize the grasp of the hook.

Where the hook is part of an elastic cord and hook set, once the first hook has been engaged, the grasping of the second hook provides a stable, nonslip grip so that the elastic cord can be pulled to be engaged at any appropriate attaching point. The hook with the elastic cord attached at the other end, and gripped, forces the pushing of the elastic cord, as distinguished from some form of pulling the second hook to the place where it will be engaged. The importance of this is that the hook being gripped, cannot slip. When a hook is pulled, it is more likely to slip from a grasp and freely fly, to cause possible injury in its flight path.

The end of the hook of the present invention, is curved inward, so that even in flight, no pointed edge is likely to be available to cause any damage. The prior art wire hooks are open "U" or "J" shaped hooks, which pose a substantial danger, if unleashed under the tension of a tensioned elastic cord. The curvature of the hook further enables a sliding engagement flowing around any object to which the hook is to be engaged. The engagement is a cradling within the hook of the engaged post, strut or other object because of the hook's curvature. The cradling avoids the likelihood of easy disengagement. The curvature of the inner portion of the hook under the tension of the cord or bungee, tends to reengage a jostled hook, recradling the hook on the object to which it is affixed.

The hook compactly receives the elastic cord in the integral tapered channel. The ferrule like end crimp over the short folded end of the elastic cord, securely engages the elastic cord end in the channel, so that it cannot, under normal circumstances, be disengaged. Since the hook and elastic cord set is oftentimes used with luggage carriers, the opening between the hook and the finger grip or finger holes, may receive the strap of an identification tag to identify the owner of the hook and elastic cord set and/or the luggage carrier to which it is engaged.

Where a hook for an elastic cord is pulled from the end of the hook, for its engagement, it is difficult to manipulate the hook to place it in position. There is always the risk of accidental release of the hook on the tensioned elastic cord.

The lip fully extends substantially beyond the point of the hook. Thus, the point of the hook is at all times protected against any outward exposure and doing damage, particularly if it is ever in flight.

The opening in the hook's cord receiving channel evenly distributes stress at the tensioned elastic cord engaged in it. The mere provision of finger holes per se, in a hook for an elastic cord, does not provide the safety of the present invention.

The configuration of the present invention is specifically designed for the environment of the elastic cord or bungee, as distinguished from hook engaging devices of the prior art used for engaging cable or rope.

Ideally, the center line of the elastic cord, engaged in the channel is in a straight line with the center of the hook. In a preferred embodiment, the hook is two and one half inches wide. The width of the hook is sufficient so that even without the use of the finger holes, it would be difficult for the hook to slip through the grasping hand as the hook is being engaged, as hooks of the past have done.

According to the present invention a hook for an elastic cord is provided. The hook has a molded plastic body, a hook, a finger grip, and an elastic cord receiving portion. The hook has an end substantially on a plane with and extending to a point above the outer edge of the elastic cord receiving portion defining an opening. The finger grip is located between the top of the elastic cord hook and the bottom of said elastic cord receiving portion. The finger grip can accommodate at least one finger.

The elastic cord hook elastic cord receiving portion may be tapered and should be of a size to receive an elastic cord end. The other end of the elastic cord receiving portion may be of a size to securely engage a crimped end of an elastic cord.

The elastic cord hook may include a lip which extends outward from the outer edge of the elastic cord receiving portion. The elastic cord hook's cord receiving portion may be a channel cradling a crimped end of the elastic cord. The channel itself may be enclosed.

The bottom end of the elastic cord receiving portion channel may include an inward camber and the finger grip portion may be opposite the elastic cord receiving portion on the outer periphery of the hook. There may be at least two finger grips with finger holes.

The elastic cord hook may be used in combination with an elastic cord which may be a bungee engagable in the elastic cord receiving portion. The cord end may be crimped with an encircling metal band of greater diameter than the elastic cord. The crimp may include an end fold in the elastic cord.

The inner configuration of the hook may be ear shaped. The present invention may also include a hook set. The hook set has an elastic cord and two hooks, at least one of which has a molded plastic body, a hook, a finger grip, and an elastic cord receiving portion. The hook has an end substantially on a plane with and extending to a point above the outer edge of the elastic cord receiving portion defining an opening. The finger grip is located between the top of the elastic cord hook and the bottom of said elastic cord receiving portion. The finger grip can accommodate at least one finger. The elastic cord has at least one crimped end engaged in the at least one the elastic cord receiving portions.

The elastic cord hook set's elastic cord receiving portion, in at least one of the cord hooks, may be tapered and should be of a size to receive an elastic cord end. The other end of the elastic cord receiving portion may be of a size to securely engage a crimped end of an elastic cord.

At least one of the elastic cord hooks may include a lip which extends outward from the outer edge of the elastic cord receiving portion. The elastic cord hook's cord receiving portion may be a channel cradling a crimped end of the elastic cord. The channel itself may be enclosed and the bottom end of the elastic cord receiving portion channel may include an inward camber and the finger grip portion may be opposite the elastic cord receiving portion on the outer periphery of the hook. There may be at least two finger grips with finger holes.

The elastic cord in the set may be a bungee engagable in at least one of the elastic cord receiving portions. The cord end may be crimped with an encircling metal band of greater diameter than the elastic cord. The crimp may include an end fold in the elastic cord.

The inner configuration of at least one hook may be ear shaped.

Although such novel feature or features believed to be characteristic of the invention are pointed out in the claims, the invention and the manner in which it may be carried, may be further understood by reference to the description following and the accompanying drawing.

BRIEF DESCRIPTION OF THE DRAWING

FIG. 1 is a front elevation of a hook for an elastic cord of the present invention.

FIG. 2 is a top plan view of FIG. 1 with the hook broken away.

FIG. 3 is a bottom plan view of FIG. 1.

FIG. 4 is a front elevation of a hook for an elastic cord of FIG. 1 with the hook portion cut away and an elastic cord extended through the channel.

FIG. 5 is an elastic cord and hook set with the elastic cord broken away.

Referring now to the figures in greater detail, where like reference numbers denote like parts in the various figures.

DESCRIPTION OF THE PREFERRED EMBODIMENTS

The elastic cord hook 10 of the present invention as shown in the FIGS. has a plastic body 11 which is preferably molded. The plastic body 11 has a hook portion 12, a finger grip portion 13 and an elastic cord engaging portion 14. The elastic cord engaging portion 14 includes a lip 15. The finger grip portion 13 has finger holes 16. The hook portion 12 includes a hook end 17 spaced away from the elastic cord engaging portion 14 and curved inward of the outer edge of the elastic cord engaging portion 14, substantially defining an ear shape.

There is a utility opening 18 between the inside of the hook portion 12 and the finger holes 16.

The elastic cord engaging portion 14 has a channel 19 which tapers from a wide opening 20 to narrow opening 21. As show in FIG. 3 the narrow opening 21 preferably has an inward camber 22. The narrow opening 21 may be defined by a small flange 23 as can be seen in FIG. 2.

The hook set 24 as shown in FIG. 5 has two elastic cord hooks 10 engaged on an elastic cord 25 or bungee. The elastic cord 25 as shown in FIG. 4 is threaded through the channel 19, folded over and held by metal band 26 crimped around it. The metal band 26 is of greater diameter than the narrow opening 21 in the channel 19.

OPERATION

In use, in a preferred embodiment, two elastic cord hooks 10 are engaged, one each, at the end of the elastic cord 27 of an elastic cord 25. The elastic cord 25 is preferably folded over and crimped with a metal band 26 or staple. The metal band 26 keeps the end of the elastic cord 27 from unraveling and further bunches the end of the elastic cord 27 so that it can fit into the channel 19 and be held in the channel 19 under all use tensions without risk of release. The metal band 26 is tightly engaged in the channel 19 with the metal band 26 stopped against the inward camber 22 and the narrow opening 21.

In the usual use of hook set 24, such as on a collapsible luggage carrier, one elastic cord hook 10 is engaged around a post or strut, then lashed around a piece of luggage or a package. The other elastic cord hook 10 is then tensioned, by its other end being engaged and it is remotely hooked down.

In lashing down, the elastic cord hook 10 is preferably grasped with two fingers engaged through the finger holes 16 and the thumb wrapped around the elastic cord engaging portion 14. The thumb is further abutted against the lip 15. Once an elastic cord hook 10 is engaged the elastic cord 25 tensions the other elastic cord hook 10 as it is moved to its place of engagement. The elastic cord hook 10 is securely held against all possible disengagement from the hand by the fingers in the finger holes 16 and the thumb abutting the lip 15.

The gripped, tensioned elastic cord hook 10 must be pushed to its point of engagement. The gripping enables greater control over the movement of the elastic cord hook 10, greater ease of movement and enables easier engagement of the elastic cord hook 10 at its securing point. The point of attachment for the elastic cord hook 10 may be somewhat inaccessible, thus the gripping is important and does not risk any dangerous release of the elastic cord hook 10.

The hook end 17 is curved inward forming the ear shape of the hook portion 12. The inward curvature of the hook end 17 forms a guide for the engagement of the elastic cord hook 10. The ear shaped curvature of the hook portion 12 under the tension of the elastic cord 25 further tends to reguide the elastic cord hook 10 to its position in the event of any jostling in use.

The outward curvature of the lip 15 and the inward curvature of the hook end 17 protect against the tensioned elastic cord hook 10 having the hook end 17 cause injury on the remote chance that it is released and in free flight.

The fact that the elastic cord hook 10 is of molded plastic still provides it with all the strength it need to secure its load yet provides a lighter, inexpensive object than some metal hooks of the past.

The hook of U.S. Pat. No. 4,831,692 for instance does not have its hook end well protected. The opening 212 of the hook if used for engaging the hook to lash a load, must be pulled into position as distinguished from being gripped and pushed. The finger manipulation to engage the hook may unleash the hook as a flying metal missile.

The utility opening 18 can be used for the attachment of an identification label.

The terms and expression which are employed are used as terms of description; it is recognized, though, that various modifications are possible.

It is also understood the following claims are intended to cover all of the generic and specific features of the invention herein described, and all statements of the scope of the invention which, as a matter of language, might fall therebetween.

Having described certain forms of the invention in some detail, what is claimed is:

1. A load lashing hook for an elastic cord comprising a one piece molded plastic body, said molded plastic body including an integral hook portion at a top of said body, an elastic cord receiving means at a bottom of said body, and a finger grip portion intermediate said body top and bottom below said hook portion and laterally disposed relative to said hook portion and cord receiving means, said finger grip portion including at least one finger grip opening, said hook portion being open at a lateral edge of said body which is opposite said finger grip portion, and a lip extending laterally outward and away from said elastic cord receiving means and said finger grip portion at the same lateral edge of said body as the open part of said hook portion, the cord receiving means being intermediate, said lip and said finger grip portion, whereby upward movement of a finger in contact with said cord receiving means is prevented.

2. A load lashing hook set including an elastic cord and two hooks, one hook at each end of said elastic cord, at least one of said two hooks being a load lashing hook in accordance with claim 1, said elastic cord including at least one crimped end, and said at least one crimped end engaged in said at least one said elastic cord receiving means.

3. A load lashing hook for an elastic cord comprising a one piece molded plastic body, said molded plastic body including an integral hook portion at a top of said body, an elastic cord receiving means at a bottom of said body, and a finger grip portion intermediate said body top and bottom below said hook portion, substantially the entirety of said finger grip portion being laterally disposed relative to said hook portion and cord receiving means, said finger grip portion including at least one finger grip opening, said hook portion being open at a lateral edge of said body which is opposite said finger grip portion and finger engaging means on said elastic cord receiving means and at said lateral edge of said body for preventing upward movement of a finger engaging said elastic cord receiving means, said cord receiving means being disposed between said finger grip portion and said finger engaging means.

4. An elastic cord hook as in claim 3 wherein said elastic cord receiving means is tapered.

5. An elastic cord hook as in claim 4 wherein the bottom end of said elastic cord receiving means is of a size to receive an elastic cord end therethrough.

6. An elastic cord hook as in claim 5 wherein said bottom end of said elastic cord receiving means channel includes an inward camber.

7. An elastic cord hook as in claim 5 wherein the the other end of said elastic cord receiving means is of a size to securely engage a crimped end of said elastic cord.

8. An elastic cord hook as in claim 7 wherein said elastic cord is a bungee.

9. An elastic cord hook as in claim 7 wherein said elastic cord is engaged in said elastic cord receiving means.

10. An elastic cord hook as in claim 9 wherein said elastic cord end is crimped.

11. An elastic cord hook as in claim 10 wherein said crimp includes an encircling metal band of greater diameter than said elastic cord.

12. An elastic cord hook as in claim 11 wherein said crimp includes an end fold in said elastic cord.

13. An elastic cord hook as in claim 3 wherein said elastic cord receiving means is a channel.

14. An elastic cord hook as in claim 13 including a crimped end of said elastic cord, said crimped end cradled within said elastic cord receiving means.

15. An elastic cord hook as in claim 13 wherein said elastic cord receiving means in said molded body is an enclosed channel.

16. An elastic cord hook as in claim 3 wherein said finger grip portion is opposite said elastic cord receiving means and on the outer periphery of said hook.

17. An elastic cord hook as in claim 3 wherein said finger grip portion includes at least two finger grips.

18. An elastic cord hook as in claim 3 wherein at least one said finger grip includes a finger hole.

19. An elastic cord hook as in claim 3 including in combination an elastic cord.

20. An elastic cord hook as in claim 3 wherein the inner configuration of said hook portion is ear shaped.

21. A load lashing hook set including an elastic cord and two hooks, one hook at each end of said elastic cord, at least one of said two hooks being a load lashing hook in accordance with claim 3, said elastic cord including at least one crimped end, and said at least one crimped end engaged in said at least one said elastic cord receiving means.

22. An elastic cord hook set as in claim 21 wherein said elastic cord receiving means in said at least one molded plastic body is tapered.

23. An elastic cord hook as in claim 22 wherein the bottom end of said elastic cord receiving means in said at least one molded plastic body is of a size to receive an elastic cord end therethrough.

24. An elastic cord hook as in claim 23 wherein the other end of said elastic cord receiving means is of a size to securely engage a crimped end of said elastic cord.

25. An elastic cord hook set as in claim 21 wherein said elastic cord receiving means in said at least one molded plastic body is a channel.

26. An elastic cord hook set as in claim 25 wherein said crimped end of said elastic cord is cradled within said elastic cord receiving means.

27. An elastic cord hook set as in claim 25 wherein said elastic cord receiving means includes an enclosed channel.

28. An elastic cord hook set as in claim 25 wherein said bottom end of said elastic cord receiving means channel includes an inward camber.

29. An elastic cord hook set as in claim 21 wherein said at least one molded plastic body finger grip portion is opposite said elastic cord receiving means and on the outer periphery of said hook.

30. An elastic cord hook set as in claim 21 wherein said at least one molded plastic body finger grip portion includes at least two finger grips.

31. An elastic cord hook set as in claim 21 wherein said finger grip in said at least one molded plastic body includes a finger hole.

32. An elastic cord hook set as in claim 21 wherein said elastic cord is a bungee.

33. An elastic cord hook set as in claim 21 wherein at least one said end crimp includes an encircling metal band of greater diameter than said elastic cord.

34. An elastic cord hook set as in claim 21 wherein said at least one end crimp includes an end fold in said elastic cord.

35. An elastic cord hook set as in claim 21 wherein the inner configuration of said at least one plastic body hook portion is ear shaped.

* * * * *